US011976511B2

(12) United States Patent
Montz et al.

(10) Patent No.: US 11,976,511 B2
(45) Date of Patent: May 7, 2024

(54) THERMAL DAMPENING DEVICES FOR WINDOW SYSTEMS

(71) Applicant: Arconic Technologies LLC, Pittburgh, PA (US)

(72) Inventors: Stephen Montz, Bella Vista, AR (US); Ion-Horatiu Barbulescu, Marietta, GA (US)

(73) Assignee: Arconic Technologies LLC, Pittsburgh, PA (US)

( * ) Notice: Subject to any disclaimer, the term of this patent is extended or adjusted under 35 U.S.C. 154(b) by 0 days.

(21) Appl. No.: 17/721,802

(22) Filed: Apr. 15, 2022

(65) Prior Publication Data

US 2023/0142702 A1 May 11, 2023

Related U.S. Application Data

(60) Provisional application No. 63/276,395, filed on Nov. 5, 2021.

(51) Int. Cl.
*E06B 3/58* (2006.01)

(52) U.S. Cl.
CPC .................................. *E06B 3/5828* (2013.01)

(58) Field of Classification Search
CPC ........ E06B 3/58; E06B 3/5821; E06B 3/5828; E06B 3/62; E06B 3/26301; E06B 3/26303; E06B 2003/26325; E06B 2003/26327; E06B 2003/2633
See application file for complete search history.

(56) References Cited

U.S. PATENT DOCUMENTS 3,064,320 A 11/1962 Henry
6,202,353 B1 * 3/2001 Giacomelli ........... E06B 3/2675 49/504
10,184,288 B2 * 1/2019 Blijweert .................. E06B 1/18
11,414,917 B2 * 8/2022 Fumagalli ............. E06B 3/2632
11,512,521 B2 * 11/2022 Vansickle ................. E06B 1/02
2005/0204657 A1 * 9/2005 Ellingson ................ E04G 21/30 52/204.1
2010/0175339 A1 * 7/2010 Moriya ..................... E06B 7/10 49/404
2014/0053488 A1 * 2/2014 Lenox ....................... E06B 3/34 49/404

(Continued)

FOREIGN PATENT DOCUMENTS

CH 686843 A5 * 7/1996 ........... E06B 3/2632
CN 107476714 A * 12/2017 ......... E06B 3/26303

(Continued)

OTHER PUBLICATIONS

Machine Translation of DE102015009867A1, https://worldwide.espacenet.com/; Mar. 8, 2023 (Year: 2023).*

(Continued)

*Primary Examiner* — Ryan D Kwiecinski
(74) *Attorney, Agent, or Firm* — Vorys, Sater, Seymour and Pease, LLP

(57) ABSTRACT

A window system includes a frame, a glazing assembly held within the frame and including a glass stop attachable to the frame, wherein attaching the glass stop to the frame defines an air pocket between the glass stop and the frame, and a thermal dampening device positioned within the air pocket and defining one or more discrete cavities.

18 Claims, 3 Drawing Sheets

(56) References Cited

U.S. PATENT DOCUMENTS

2021/0316513 A1* 10/2021 Möller .............. B29C 66/81465

FOREIGN PATENT DOCUMENTS

| | | | | | |
|---|---|---|---|---|---|
| CN | 109113544 | A | * | 1/2019 | E06B 3/2632 |
| CN | 110374460 | A | * | 10/2019 | |
| CN | 110485895 | A | * | 11/2019 | |
| CN | 111058742 | A | * | 4/2020 | |
| CN | 112196407 | A | * | 1/2021 | E06B 3/26301 |
| CN | 113445872 | A | * | 9/2021 | |
| CN | 113445873 | A | * | 9/2021 | |
| CN | 113445875 | A | * | 9/2021 | |
| CN | 114016883 | A | * | 2/2022 | |
| DE | 4403844 | A1 | | 8/1995 | |
| DE | 29701351 | U1 | | 4/1997 | |
| DE | 9422032 | U1 | | 11/1997 | |
| DE | 29817976 | U1 | * | 12/1998 | E06B 3/26301 |
| DE | 10356575 | A1 | * | 10/2004 | E06B 1/325 |
| DE | 202005006398 | U1 | * | 9/2005 | E06B 3/2632 |
| DE | 202011100184 | U1 | * | 9/2011 | E06B 3/302 |
| DE | 102013100249 | A1 | * | 7/2014 | E06B 3/5835 |
| DE | 202013103716 | U1 | * | 12/2014 | C08G 69/26 |
| DE | 102014115422 | A1 | * | 4/2016 | E06B 3/26341 |
| DE | 102015009867 | A1 | * | 2/2017 | |
| DE | 102016119580 | A1 | * | 4/2018 | E06B 1/18 |
| DE | 102019100614 | A1 | * | 7/2020 | E06B 3/26301 |
| DE | 202019103072 | U1 | * | 10/2020 | |
| DE | 102020120661 | A1 | * | 4/2021 | E06B 7/06 |
| DE | 202019106571 | U1 | * | 4/2021 | E06B 3/22 |
| DE | 102020107021 | A1 | * | 9/2021 | E06B 3/2605 |
| EP | 2374978 | A2 | * | 10/2011 | E06B 3/263 |
| EP | 2472045 | A2 | * | 7/2012 | E06B 3/26301 |
| EP | 2746515 | A2 | * | 6/2014 | E06B 3/305 |
| EP | 3276116 | A2 | * | 1/2018 | E06B 3/26303 |
| EP | 3276116 | A3 | * | 6/2018 | E06B 3/26303 |
| EP | 3339550 | A1 | * | 6/2018 | E06B 3/26303 |
| GB | 2467649 | A | * | 8/2010 | E06B 3/5821 |
| GB | 2487910 | A | * | 8/2012 | E06B 3/26345 |
| WO | 9709504 | A1 | | 3/1997 | |
| WO | WO-2015092526 | A1 | * | 6/2015 | E06B 1/16 |
| WO | WO-2018065841 | A1 | * | 4/2018 | E06B 3/26303 |

OTHER PUBLICATIONS

DE 202011100184 Machine Translation; https://worldwide.espacenet.com; Sep. 5, 2023 (Year: 2023).*

Extended European Search Report from corresponding Application No. 22169047.4 mailed Sep. 28, 2022.

* cited by examiner

THERMAL DAMPENING DEVICES FOR WINDOW SYSTEMS

BACKGROUND

Windows are commonly used in residential and commercial buildings, e.g., in storefronts and in curtain walls used on the façade of high-rise buildings. Aesthetic considerations play an important part in architectural design of buildings, including the design of its window systems. Another important factor in architectural design, however, is the overall energy efficiency of a building, including energy transfer characteristics of its window systems. There is a continued demand for building features and methods of construction that improve energy efficiency.

Some windows and window systems utilize frames made of metal, such as aluminum or an aluminum alloy, and such metal frames can reduce the thermal efficiency of the building by serving as conductors of thermal energy between the exterior and the interior of a building. Improved and/or alternative structures and methods for controlling the heat transfer characteristics of windows and window structures, while simultaneously achieving or maintaining aesthetic design objectives, remain desirable.

SUMMARY OF THE DISCLOSURE

Embodiments disclosed herein include a window system that includes a frame, a glazing assembly held within the frame and including a glass stop attachable to the frame, wherein attaching the glass stop to the frame defines an air pocket between the glass stop and the frame, and a thermal dampening device positioned within the air pocket and defining one or more discrete cavities. In a further embodiment, the frame includes a head, a sill, and opposing left and right vertical jambs extending between the head and the sill, and wherein the glass stop is attachable to any one of the head, the sill, and the opposing left and right vertical jambs. In another further embodiment, the thermal dampening device provides a base and one or more fins that extend from the base, the one or more fins defining the one or more discrete cavities. In another further embodiment, the base is removably attached to the glass stop. In another further embodiment, the one or more fins extend to and engage the frame. In another further embodiment, further comprising a thermal break mounted to the frame, wherein at least one of the one or more fins contacts the thermal break. In another further embodiment, wherein the base and the one or more fins are made of a thermoplastic polymer. In another further embodiment, the base is made of a rigid material and the one or more fins are made of flexible material different from the rigid material. In another further embodiment, the base and the one or more fins are co-extruded. In another further embodiment, the thermal dampening device extends between and contacts the glass stop and the frame. In another further embodiment, the thermal dampening device provides multiple structural members that cooperatively define the one or more discrete cavities. In another further embodiment, at least a portion of the thermal dampening device is made of an elastomer to seal an interface between the frame and the thermal dampening device.

Embodiments disclosed herein may further include a method of reducing thermal transmission through a window system, the method including the steps of positioning a thermal dampening device within an air pocket defined between a glass stop of a glazing assembly and a frame of the window assembly, wherein the thermal dampening device defines one or more discrete cavities, and reducing thermal transmission through the air pocket with the thermal dampening device. In a further embodiment, the method further includes educing convective heat transfer through the air pocket with the one or more discrete cavities. In another further embodiment, the thermal dampening device extends between and contacts the glass stop and the frame, the method further comprising reinforcing the glass stop with the thermal dampening device. In another further embodiment, at least a portion of the thermal dampening device is made of an elastomer, the method further comprising sealing an interface between the frame and the thermal dampening device with the thermal dampening device.

Embodiments disclosed herein may further include a method of retrofitting a window system, the method including the steps of removing a glass stop from a glazing assembly held within a frame of the window assembly, arranging a thermal dampening device such that it is positioned within an air pocket defined between the glass stop and the frame when the glass stop is attached to the frame, and reattaching the glass stop to the frame, wherein the thermal dampening device defines one or more discrete cavities. In a further embodiment, the thermal dampening device extends between and contacts the glass stop and the frame, the method further comprising reinforcing the glass stop with the thermal dampening device. In another further embodiment, arranging the thermal dampening device comprises removably attaching the thermal dampening device to the glass stop. In another further embodiment, at least a portion of the thermal dampening device is made of an elastomer, the method further comprising sealing an interface between the frame and the thermal dampening device with the thermal dampening device.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to window systems and, more particularly, to thermal dampening devices deployed into glass retention devices or "glass stops" for the purpose of reducing thermal transmission (radiant, convective, etc.) through a large air pocket defined, at least partially, by the glass retention device.

Window systems often include large air cavities commonly formed by deep and/or tall glass retention devices, alternatively referred to as "glass stops". These air cavities facilitate a high rate of thermal transmission from the exterior to the interior of a building, and vice versa. The window system embodiments presented herein incorporate the use of a thermal dampening device, which can be located in the large air cavity of a glass stop for the purpose of mitigating or reducing thermal transmission through the window system. Example thermal dampening devices can be made of low emissivity thermoplastic polymers or other low emissivity materials. Moreover, the thermal dampening devices described herein can include structural features that effectively break up the air pocket into smaller air cavities, which helps to break up and slow thermal waves into smaller interrupted waves, and thereby mitigates or interrupts thermal transmission through the air pocket. Portions of the thermal dampening devices described herein can also be made of flexible materials, which allows the thermal dampening device to conform to various designs and configurations of the glass stop.

Figure 1:
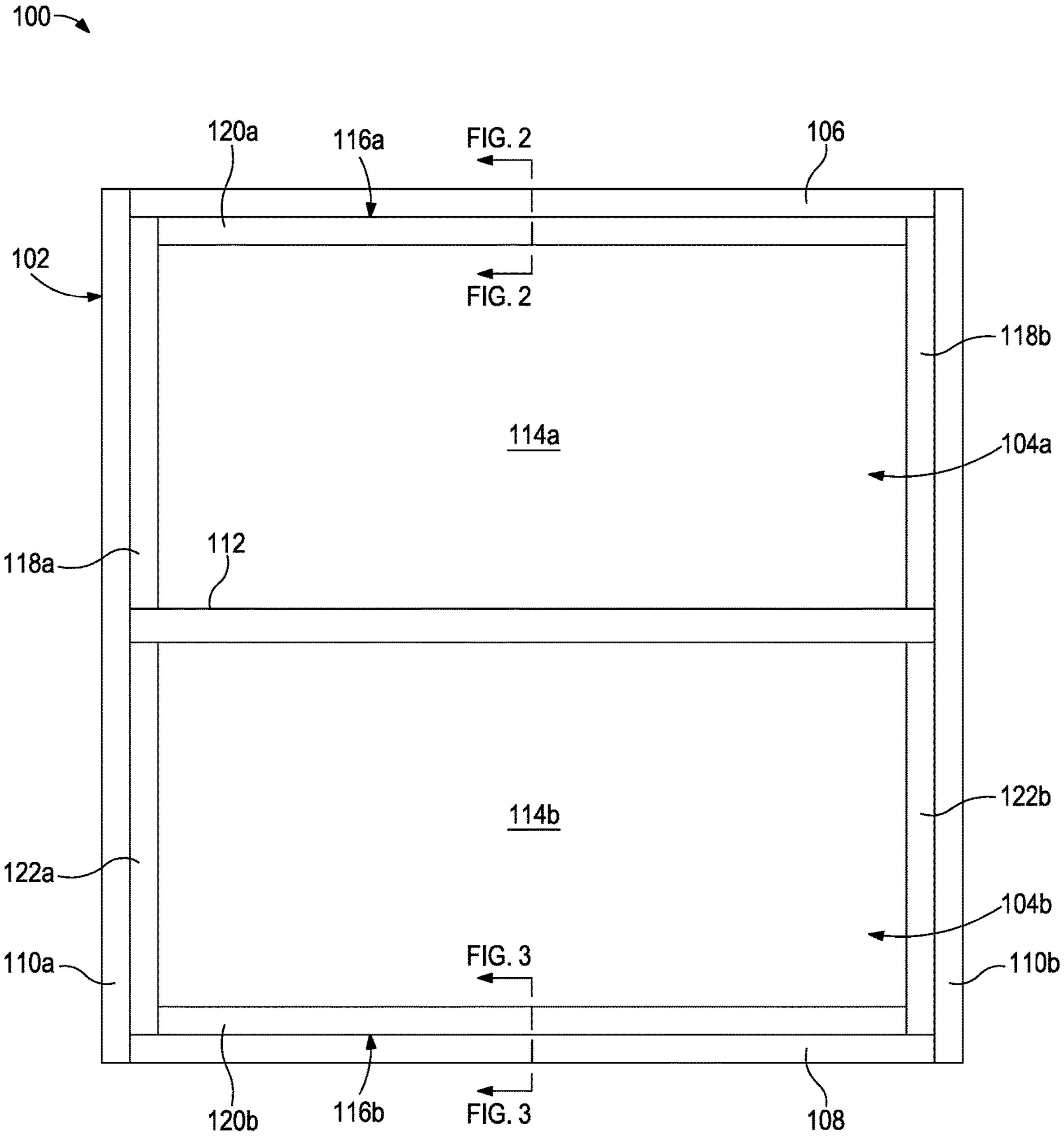
FIG. 1 is a schematic diagram of an example window system 100 that may incorporate the principles of the present disclosure.

FIG. 1 is a schematic diagram of an example window system 100 that may incorporate the principles of the present disclosure. As illustrated, the window system 100 includes a frame 102, and upper and lower glazing assemblies 104*a* and 104*b* (alternately referred to as "lite assemblies") are held within the frame 102. The frame 102 includes a horizontally mounted head 106 and a horizontally mounted sill 108 vertically opposite the head 106. Opposing left and right vertical jambs 110*a* and 110*b* extend vertically between the head 106 and the sill 108 to complete the sides of the frame 102.

In the illustrated embodiment, the upper and lower glazing assemblies 104*a,b* are separated by an integral horizontal rail 112, alternately referred to as a "meeting" rail, that extends horizontally between the vertical jambs 110*a,b*. In other embodiments, however, the horizontal rail 112 is omitted and the upper and lower glazing assemblies 104*a,b* could be combined into a single, monolithic glazing assembly, without departing from the scope of the present disclosure.

The upper glazing assembly 104*a* includes a first glazing or infill 114*a* held in place, at least partially, with an upper glazing adapter 116*a* that coincides with the head 106 and the left and right vertical jambs 110*a,b*. More specifically, the upper glazing adapter 116*a* includes opposing left and right vertical glazing adapters 118*a* and 118*b*, and an upper horizontal glazing adapter 120*a* extending horizontally between the vertical glazing adapters 118*a,b*. Similarly, the lower glazing assembly 104*b* includes a second infill 114*b* held in place, at least partially, with a lower glazing adapter 116*b* that coincides with the sill 108 and the left and right vertical jambs 110*a,b*. The lower glazing adapter 116*b* includes opposing left and right vertical adapters 122*a* and 122*b*, and a lower horizontal glazing adapter 120*b* extending horizontally between the vertical glazing adapters 122*a,b*.

The infills 114*a,b* may comprise, for example, panes of window glass, polycarbonates, or other clear, translucent, tinted, or opaque panels.

Figure 2:
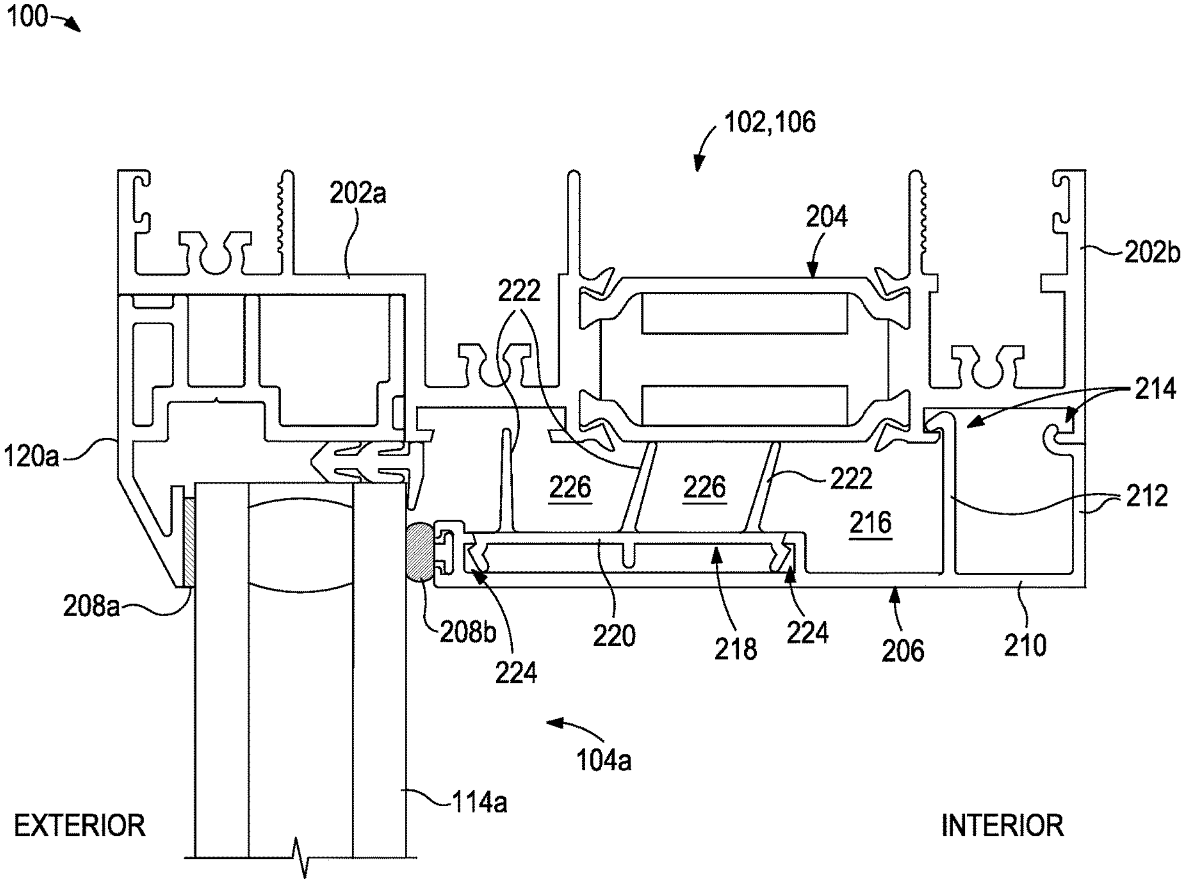
FIG. 2 is a schematic section view of the window assembly of FIG. 1, as taken along the corresponding section lines indicated in FIG. 1, according to one or more embodiments.

FIG. 2 is a schematic section view of the window assembly 100, as taken along the corresponding section lines indicated in FIG. 1, according to one or more embodiments. More specifically, FIG. 2 depicts a section view of the top portion of the frame 102 (i.e., the head 106), to which the upper horizontal glazing adapter 120*a* of the upper glazing assembly 104*a* is coupled. While the discussion below is directed to a section of the frame 102 located at the head 106, the principles described herein are equally applicable to other sections or locations of the frame 102, such as at the bottom portion of the frame 102 (i.e., the sill 108 of FIG. 1) or at either of the vertical jambs 110*a,b*, without departing from the scope of the disclosure.

As illustrated, the frame 102 (i.e., the head 106) may include a first or "exterior" portion 202*a* and a second or "interior" portion 202*b*. The exterior portion 202*a* is generally exposed to the exterior of a building, while the interior portion 202*b* is generally exposed to the interior of the building. To improve thermal performance of the window assembly 100, the frame 102 may include a thermal break 204, which operates to interconnect the exterior and interior portions 202*a,b* while simultaneously preventing conductive thermal energy loss between the exterior and interior portions 202*a,b*. The thermal break 204 may be made of one or more materials having a thermal conductivity that is less than the thermal conductivity of the frame 102, such as a polyurethane foam, a polymer, or the like.

As depicted in FIG. 2, the first infill 114*a* is secured between the upper horizontal glazing adapter 120*a* and a glass stop 206. Both the upper horizontal glazing adapter 120*a* and the glass stop 206 are coupled to the frame 102 (i.e., the head 106). An exterior gasket 208*a* interposes the first infill 114*a* and the upper horizontal glazing adapter 120*a*, and an interior gasket 208*b* interposes the first infill 114*a* and the glass stop 206. The gaskets 208*a,b* may be made of a variety of materials capable of generating a sealed interface at their respective locations. In the illustrated embodiment, the interior gasket 208*b* comprises a bulb gasket, but could alternatively comprise a wedge gasket or another type of gasket, without departing from the scope of the disclosure.

The glass stop 206, alternately referred to as a "glass retention device," a "glass bead," or a "glazing bead," provides or otherwise defines a base 210 that extends laterally from the first infill 114*a* and into the interior. As illustrated, the interior gasket 208*b* is arranged to provide a sealed interface between the base 210 and an inner surface of the first infill 114*a*.

The glass stop 206 may also include one or more legs 212 that extend from the base 210 to secure the glass stop 206 to the head 106. In some embodiments, the legs 212 may be configured to removably attach the glass stop 206 to the head 106. More specifically, one or both of the legs 212 may include an attachment mechanism 214, which may comprise any type of structural or mechanical attachment means capable of removably coupling the glass stop 206 to the frame 102 (i.e., the head 106). In the illustrated embodiment, the attachment mechanism 214 is provided on each leg 212 in the form of hook features configured to locate and engage corresponding structural features provided by the frame 102. In such embodiments, the attachment mechanism 214 allows the glass stop 206 to form a snap-fit attachment to the frame 102.

In some embodiments, the legs 212 may extend perpendicularly from the base 210, but could alternatively extend at an angle offset from perpendicular. Moreover, while two legs 212 are depicted in FIG. 2, the glass stop 206 could include more or less than two, without departing from the scope of the disclosure.

When the glass stop 206 is secured to the frame 102 (i.e., the head 106), an air pocket 216 is defined between the glass stop 206 and the frame 102. During installed use of the window assembly 100, heat may tend to transfer from the exterior to the interior by passing (at least partially) through the air pocket 216. According to embodiments of the present disclosure, such heat transfer may be reduced (mitigated) by positioning a thermal dampening device 218 within the air pocket 216.

In the illustrated embodiment, the thermal dampening device 218 provides a base 220 and one or more fins 222

(three shown) that extend from the base 220. The base 220 may provide a substantially planar substrate, and the fins 222 can extend from the base 220 in a variety of directions or angles. In some embodiments, for example, one or more of the fins 222 may extend perpendicularly from the base 220. In other embodiments, however, one or more of the fins 222 may extend from the base 220 at an angle offset from perpendicular to the base 220.

The thermal dampening device 218 may be removably attached to the glass stop 206. For example, in at least one embodiment, the base 220 may include one or more attachment features 224 configured to locate and form a snap-fit engagement with corresponding attachment features provided by the glass stop 206. In other embodiments, however, the thermal dampening device 218 may be secured to the glass stop 206 via an interference fit or using one or more mechanical fasteners (e.g., screws). In yet other embodiments, the thermal dampening device 218 may be merely placed in contact with the glass stop 206, such as being inserted lengthwise into the air pocket 216 (e.g., slid into the air pocket 216).

While FIG. 2 shows the thermal dampening device 218 being removably attached to the glass stop 206, it is contemplated herein that the thermal dampening device 218 may alternatively be removably attached to the frame 102 (e.g., the head 106), without departing from the scope of the disclosure.

The base 220 may be made of a rigid material, such as a (low emissivity) thermoplastic polymer. This allows the base 220 to be capable of snapping into engagement with the glass stop 206, while simultaneously holding its shape during wind loads and other external forces. The fins 222 may also be made of a (low emissivity) thermoplastic polymer, but may be made of a more flexible material than the base 220 and otherwise exhibit a lower durometer as compared to the base 220. In at least one embodiment, the fins 222 may be co-extruded with the base 220, but may alternatively be attached thereto via a variety of other means, such as laser welding, an interference fit, a snap-fit engagement, mechanical fasteners, or any combination thereof.

The flexibility of the fins 222 may prove advantageous in allowing the fins 222 to dynamically conform to the shape of the air pocket 216 when installed, and otherwise be compliant when coming into contact with the thermal break 204 or portions of the frame 102 (e.g., the head 106). As a result, the thermal dampening device 218 may be incorporated into a variety of design configurations for the frame 102, since the fins 222 are capable of adapting to varying shapes and sizes of the thermal break 204 and the frame 102.

The thermal dampening device 218 may also prove advantageous in helping to reinforce the glass stop 206 during heavy wind loads or installation. More specifically, as illustrated, one or more of the fins 222 may extend to engage (contact) one or both of the frame 102 (e.g., the head 106) or the thermal break 204. By extending to the frame 102 or the thermal break 204, the thermal dampening device 218 may be able to transfer loading from the glass stop 206 to the frame 102. Without the thermal dampening device 218, however, the glass stop 206 may tend to bend, flex, and even buckle during heavy wind loads or installation.

In the illustrated embodiment, the thermal dampening device 218 includes three fins 222 that extend from the base 220 and thereby define one or more discrete cavities 226 separated by laterally adjacent fins 222. The fins 222 and the resulting cavities 226 break up the air pocket 216 into smaller air cavities, which mitigates convective heat transfer and thereby helps reduce or interrupt thermal transmission through the air pocket 216. This results in reduced thermal flow and higher thermal performance of an entire glazing system.

In some embodiments, the thermal dampening device 218 may be part of a retrofit for older glazing units (e.g., windows and window systems). In such embodiments, the glass stop 206 may be detached from the head 106 and the thermal dampening device 218 may be arranged such that it resides within the air pocket 216 when the glass stop 206 is reattached to the head 106. In at least some embodiments, this may require a new or updated design for the glass stop 206, and otherwise a glass stop that is designed to receive and seat the thermal dampening device 218. Upon reattaching the glass stop 206 to the head 106, the thermal dampening device 218 will effectively divide the air pocket 216 into the plurality of discrete cavities 226 separated by laterally adjacent fins 222, as generally described above, and thereby provide a more thermally efficient and robust window.

Figure 3:
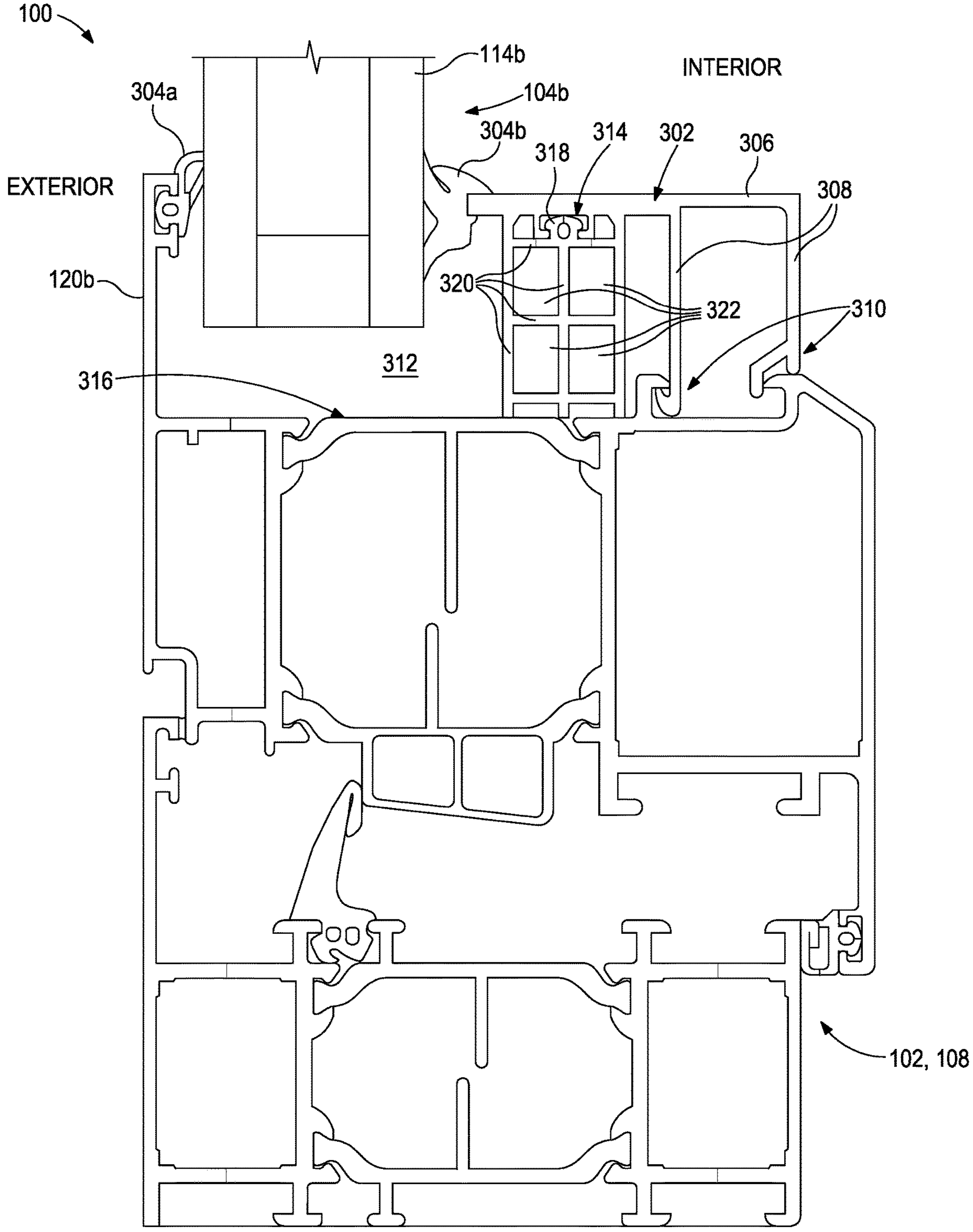
FIG. 3 is another schematic section view of the window assembly of FIG. 1, as taken along the corresponding section lines indicated in FIG. 1, according to one or more embodiments.

FIG. 3 is another schematic section view of the window assembly 100, as taken along the corresponding section lines indicated in FIG. 1, according to one or more embodiments. More specifically, FIG. 3 depicts a section view of the bottom portion of the frame 102 at the sill 108, which is coupled to the lower glazing assembly **104*b*. While FIG. 3 depicts a section of the window assembly 100 at the sill 108, the principles described below are equally applicable to other sections of the frame 102, such as at the top portion of the frame 102 (i.e., the head 106 of FIG. 1) or at either of the vertical jambs 110*a,b***, without departing from the scope of the disclosure.

As depicted in FIG. 3, the second infill **114*b* is secured between the lower horizontal glazing adapter 120*b* and a glass stop 302. Both the lower horizontal glazing adapter 120*b* and the glass stop 302 are coupled to the frame 102 (i.e., the sill 108. An exterior gasket 304*a* interposes the second infill 114*b* and the lower horizontal glazing extrusion 120*b*, and an interior gasket 304*b* interposes the second infill 114*b* and the glass stop 302. Similar to the gaskets 208*a,b* of FIG. 2, the gaskets 304*a,b* may be made of a variety of materials capable of generating a sealed interface at their respective locations. In the illustrated embodiment, the interior gasket 304*b*** comprises a wedge gasket, but could alternatively comprise a bulb gasket or another type of gaskets, without departing from the scope of the disclosure.

Similar to the glass stop 206 of FIG. 2, the glass stop 302 provides or otherwise defines a base 306 that extends laterally from the second infill **114*b* and into the interior when installed. The interior gasket 304*b* is arranged to provide a sealed interface between the base 306 and an inner surface of the second infill 114*b***.

The glass stop 302 may also include one or more legs 308 that extend from the base 306 to secure the glass stop 302 to the sill 108. In some embodiments, the legs 308 may be configured to removably attach the glass stop 302 to the sill 108. More specifically, at least one of the legs 308 may include an attachment mechanism 310, which may comprise any type of structural or mechanical attachment means capable of removably coupling the glass stop 302 to the frame 102 (i.e., the sill 108). In the illustrated embodiment, the attachment mechanism 310 is provided on both legs 308 in the form of hook features configured to locate and engage corresponding structural features provided by the frame 102. Accordingly, the attachment mechanism 310 allows the glass stop 302 to form a snap-fit attachment to frame 102.

In some embodiments, the legs 308 may extend perpendicularly from the base 306, but could alternatively extend at an angle offset from perpendicular. Moreover, while two legs 308 are depicted in FIG. 3, the glass stop 302 could include more or less than two, without departing from the scope of the disclosure.

When the glass stop 302 is secured to the frame 102 (i.e., the sill 108), an air pocket 312 is defined between the glass stop 302 and the frame 102. During installed use of the window assembly 100, heat may tend to transfer from the exterior to the interior, or vice versa, by passing (at least partially) through the air pocket 312. According to embodiments of the present disclosure, such heat transfer may be reduced (mitigated) by positioning a thermal dampening device 314 within the air pocket 312.

In the illustrated embodiment, the thermal dampening device 314 extends between the glass stop 302 and the frame 102 (i.e., the sill 108). In at least one embodiment, as illustrated, the thermal dampening device 314 may extend to engage the frame 102 and, more particularly, a thermal break 316 mounted to or otherwise forming part of the sill 108.

In some embodiments, the thermal dampening device 314 may be positioned (e.g., slid into place) before the glass stop 302 is installed. In other embodiments, the thermal dampening device 314 may be removably attached to the glass stop 302. In at least one embodiment, for example, the glass stop 302 may provide or otherwise define one or more attachment features 318 configured to be received by or within a corresponding attachment feature provided by the glass stop 302. In such embodiments, the attachment feature 318 may facilitate a snap-fit or mated engagement with the glass stop 302. In other embodiments, however, the thermal dampening device 314 may be secured to the glass stop 302 via an interference fit or using one or more mechanical fasteners (e.g., screws). In yet other embodiments, the thermal dampening device 314 may be merely placed in contact with the glass stop 302, such as being inserted lengthwise into the air pocket 312 (e.g., slid into the air pocket 312).

While FIG. 3 shows the thermal dampening device 314 being removably attached to the glass stop 302, it is contemplated herein that the thermal dampening device 314 may alternatively be removably attached to the frame 102 (e.g., the sill 108), without departing from the scope of the disclosure.

In the illustrated embodiment, the thermal dampening device 314 provides or otherwise includes multiple structural members 320 that cooperatively define one or more discrete cavities 322. More specifically, the structural members 320 can comprise vertical and horizontal members that jointly create the cavities 322, but could alternatively comprise members that extends in directions offset from vertical and horizontal. The structural members 320 and resulting cavities 322 may prove advantageous by breaking up the air pocket 312 into smaller air cavities, which mitigates convective heat transfer and thereby helps reduce or interrupt thermal transmission through the air pocket 312. This results in reduced thermal flow and higher thermal performance of an entire glazing system.

In some embodiments, the thermal dampening device 314 may be made of a rigid or semi-rigid material, such as a (low thermal conductivity) thermoplastic polymer. In other embodiments, however, some or all of the thermal dampening device 314 may be made of an elastomer, such as ethylene propylene diene monomer (EPDM) or thermoplastic vulcanisate (TPV). In one or more embodiments, the outer surface of the thermal dampening device 314 could have a coating of a low-emissivity material applied thereto. Having the thermal dampening device 314 made of an elastomer may prove advantageous in a few ways. First, this allows the thermal dampening device 314 to be flexible and yet provide structural support (reinforcement) to the glass stop 302. More specifically, positioning the thermal dampening device 314 in the air pocket 312 helps transfer loading from the glass stop 302, to the thermal dampening device 314, which transfers at least a portion of the loading to the frame 102 (i.e., the sill 108).

Second, having the thermal dampening device 314 at least partially made of an elastomer may allow the thermal dampening device 314 to operate as a type of gasket or seal within the air pocket 312. More specifically, the thermal dampening device 314 may form a sealed interface at the sill 108 (e.g., at the thermal break 316) and thereby help prevent fluids (e.g., water and air) from migrating through the air pocket 312 from the exterior and into the interior. Rather, any fluids that find their way into the air pocket 312 may be stopped by the thermal dampening device 314 and forced toward a fluid weep system (not shown).

The thermal dampening device 218 of FIG. 2 may be useful in a glass stop 206 that is long or otherwise extends deep into the interior of the building. In contrast, the thermal dampening device 314 of FIG. 3 may be useful and otherwise advantageous for incorporation in a glass stop 302 that is shorter or more compact. Both thermal dampening devices 218, 314, however, may prove advantageous in structurally reinforcing the corresponding glass stop 206, 302. For example, in some applications, the interior gaskets 208*b* and 304*b* of FIGS. 2 and 3, respectively, may comprise a wedge gasket that needs to be manually installed, which requires that the wedge gasket be inserted (forced) between the infills 114*a* and 114*b* and the corresponding glass stop 206, 302. During this process, the glass stop 206, 302 may be urged to flex and rotate outward, and in some cases this may cause the glass stop 206, 302 to detach from the frame 102 at the attachment mechanism 214, 310. Inclusion of the thermal dampening device 218, 314, however, will help resist the flex/rotation and maintain the straightness of the glass stop 206, 302 when driving in the interior gasket 208*b*, 304*b*. In some embodiments, the thermal dampening device 218, 314 may be sufficiently elastic to urge the corresponding glass stop 206, 302 to spring back to its natural position once the gasket 208*b*, 304*b* is fully installed.

Similar to the thermal dampening device 218 of FIG. 2, the thermal dampening device 314 of FIG. 3 may also be part of a retrofit for older glazing units (e.g., windows). Application of the thermal dampening devices 218, 314 in a stock length form to its mating glass stop 206, 302, allows the two members to be cut to length simultaneously, and thereby reduces labor costs.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The use of directional terms such as above, below, upper, lower, upward, downward, left, right, and the like are used in relation to the illustrative embodiments as they are depicted in the figures, the upward direction being toward the top of the corresponding figure and the downward direction being toward the bottom of the corresponding figure.

What is claimed is:

1. A window system, comprising:
- a frame;
- a glazing assembly held within the frame and including:
  - an infill; and
  - a glass stop having a glass stop base extending laterally from the infill and one or more legs extending from the glass stop base and attachable to the frame, wherein attaching the one or more legs to the frame defines an air pocket between the glass stop and the frame; and
- a thermal dampening device positioned within the air pocket and engageable with the glass stop base, the thermal dampening device providing a base and a plurality of fins that extend from the base and define one or more discrete cavities,
- wherein the base is made of a rigid material and the plurality of fins are made of a flexible material different from the rigid material.

2. The window system of claim 1, wherein the frame includes a head, a sill, and opposing left and right vertical jambs extending between the head and the sill, and wherein the glass stop is attachable to any one of the head, the sill, and the opposing left and right vertical jambs.

3. The window system of claim 1, wherein the base is removably attached to the glass stop base.

4. The window system of claim 3, wherein at least one of the plurality of fins extends to and engages the frame.

5. The window system of claim 4, further comprising a thermal break mounted to the frame, wherein at least one of the plurality of fins contacts the thermal break.

6. The window system of claim 1, wherein the base and the plurality of fins are made of a thermoplastic polymer.

7. The window system of claim 1, wherein the thermal dampening device extends between and contacts the glass stop and the frame.

8. The window system of claim 7, wherein the thermal dampening device provides multiple structural members that cooperatively define the one or more discrete cavities.

9. The window system of claim 7, wherein at least a portion of the thermal dampening device is made of an elastomer to seal an interface between the frame and the thermal dampening device.

10. The window system of claim 1, wherein the plurality of fins is made of flexible material that dynamically conforms to a shape of the air pocket.

11. A method of reducing thermal transmission through a window system, comprising:
- positioning a thermal dampening device within an air pocket defined between a glazing assembly and a frame of the window system, the thermal dampening device providing a base and a plurality of fins that extend from the base and define one or more discrete cavities, the glazing assembly including:
  - an infill; and
  - a glass stop having a glass stop base extending laterally from the infill and one or more legs extending from the glass stop base and attached to the frame, wherein attaching the one or more legs to the frame defines the air pocket between the glass stop and the frame, and wherein the thermal dampening device is positioned within the air pocket and engageable with the glass stop base; and
- reducing thermal transmission through the air pocket with the thermal dampening device,
- wherein the base is made of a rigid material and the plurality of fins are made of a flexible material different from the rigid material.

12. The method of claim 11, further comprising reducing convective heat transfer through the air pocket with the one or more discrete cavities.

13. The method of claim 11, wherein the thermal dampening device extends between and contacts the glass stop and the frame, the method further comprising reinforcing the glass stop with the thermal dampening device.

14. The method of claim 11, wherein at least a portion of the thermal dampening device is made of an elastomer, the method further comprising sealing an interface between the frame and the thermal dampening device with the thermal dampening device.

15. A method of retrofitting a window system, comprising:
- removing a glass stop from a glazing assembly held within a frame of the window system, the glass stop having a glass stop base extending laterally from an infill of the glazing assembly and one or more legs extending from the glass stop base and attachable to the frame, wherein attaching the one or more legs to the frame defines an air pocket between the glass stop and the frame;
- arranging a thermal dampening device such that it is positioned within the air pocket when the glass stop is attached to the frame, the thermal dampening device providing a base and a plurality of fins that extend from the base and define one or more discrete cavities, wherein the base is made of a rigid material and the plurality of fins are made of a flexible material different from the rigid material; and reattaching the glass stop to the frame, wherein the thermal dampening device engages the glass stop base.

16. The method of claim 15, wherein the thermal dampening device extends between and contacts the glass stop and the frame, the method further comprising reinforcing the glass stop with the thermal dampening device.

17. The method of claim 15, wherein arranging the thermal dampening device comprises removably attaching the thermal dampening device to the glass stop.

18. The method of claim 15, wherein at least a portion of the thermal dampening device is made of an elastomer, the method further comprising sealing an interface between the frame and the thermal dampening device with the thermal dampening device.

* * * * *